(12) United States Patent
Su et al.

(10) Patent No.: US 12,073,647 B2
(45) Date of Patent: Aug. 27, 2024

(54) DETECTING DEVICE, DETECTING METHOD, AND RECORDING MEDIUM

(71) Applicant: NEC Corporation, Tokyo (JP)

(72) Inventors: Leiming Su, Tokyo (JP); Mamoru Inoue, Tokyo (JP); Kenta Aino, Tokyo (JP); Hiroaki Morita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/214,940

(22) Filed: Jun. 27, 2023

(65) Prior Publication Data

US 2023/0334894 A1 Oct. 19, 2023

Related U.S. Application Data

(63) Continuation of application No. 17/503,439, filed on Oct. 18, 2021, now Pat. No. 11,727,709, which is a (Continued)

(51) Int. Cl.
*G06V 10/143* (2022.01)
*G06T 7/90* (2017.01)
(Continued)

(52) U.S. Cl.
CPC .............. *G06V 40/103* (2022.01); *G06T 7/90* (2017.01); *G06V 10/143* (2022.01);
(Continued)

(58) Field of Classification Search
CPC .... G06V 40/40; G06V 10/143; G06V 40/103; G06V 40/166; G06V 10/145; G06T 7/90;
(Continued)

(56) References Cited

U.S. PATENT DOCUMENTS 7,027,619 B2 4/2006 Pavlidis et al.
7,109,470 B2 9/2006 Thorsten ................ B60A 25/25
250/226
(Continued)

FOREIGN PATENT DOCUMENTS

CN 1585957 2/2005
CN 101021898 A 8/2007
(Continued)

OTHER PUBLICATIONS

Yasuhiro Suzuki et al., "Detection Method of Skin Region by Near-IR Spectrum Multi-Band", The Transactions of the Institute of Electrical Engineers of Japan C, Apr. 1, 2007, vol. 127, No. 4, pp. 583 to 590.
(Continued)

*Primary Examiner* — Albert Kir
(74) *Attorney, Agent, or Firm* — Sughrue Mion, PLLC

(57) ABSTRACT

A light source (11) of a disguising mask detecting device (1) emits light at a person who is a subject. A camera (12) acquires images in multiple different wavelength ranges of reflected light of the light emitted at the person. A face detector (172) detects a face region of the person from the images acquired by the camera (12). A determiner (173) determines that the person is wearing a disguising mask when luminances of the face region in the images satisfy specific relations different from relations exhibited by skin.

6 Claims, 9 Drawing Sheets

Related U.S. Application Data continuation of application No. 15/124,500, filed as application No. PCT/JP2014/056756 on Mar. 13, 2014, now Pat. No. 11,188,770.

(51) Int. Cl.
  *G06V 40/10* (2022.01)
  *G06V 40/16* (2022.01)
  *G06V 40/40* (2022.01)
  *G01N 21/31* (2006.01)

(52) U.S. Cl.
  CPC ............ *G06V 40/166* (2022.01); *G06V 40/40* (2022.01); *G01N 21/314* (2013.01); *G06T 2207/10024* (2013.01); *G06T 2207/30201* (2013.01)

(58) Field of Classification Search
  CPC ........... G06T 2207/10024; G06T 2207/30201; G01N 21/314
  USPC .......................................................... 348/77
  See application file for complete search history.

(56) References Cited

U.S. PATENT DOCUMENTS

| | | | |
|---|---|---|---|
| 7,138,905 B2 | 11/2006 | Pavlidis | A61B 6185/6888 340/5.82 |
| 8,295,559 B2* | 10/2012 | Matsuura | G06V 40/171 382/103 |
| 8,411,920 B2* | 4/2013 | Saijo | G06V 10/143 382/128 |
| 2002/0000874 A1 | 4/2002 | Pavlidis | G06K 9/00228 382/118 |
| 2002/0044674 A1 | 4/2002 | Pavlidis | G06V 40/10 382/118 |
| 2002/0136435 A1 | 9/2002 | Prokoski | G06V 40/45 382/118 |
| 2003/0053664 A1 | 3/2003 | Pavlidis et al. | |
| 2003/0108223 A1 | 6/2003 | Prokoski | A61B 6185/415 382/209 |
| 2005/0105778 A1 | 5/2005 | Sung et al. | |
| 2006/0034537 A1 | 2/2006 | Masaki | |
| 2006/0102843 A1 | 5/2006 | Bazakos | G06K 9/00255 260/339.05 |
| 2011/0261163 A1 | 10/2011 | Austin | H04N 5/2258 348/46 |
| 2012/0314914 A1* | 12/2012 | Karakotsios | G06V 40/193 382/118 |
| 2013/0258086 A1 | 10/2013 | Erhart et al. | |
| 2013/0342702 A1 | 12/2013 | Zhang | G08K 9/2018 348/164 |
| 2014/0112550 A1 | 4/2014 | Hanna | G06V 10/141 382/117 |

FOREIGN PATENT DOCUMENTS

| | | |
|---|---|---|
| CN | 102622588 | 8/2012 |
| CN | 202956192 U | 5/2013 |
| EP | 1988489 A1 | 11/2008 |
| JP | 2002-084552 A | 3/2002 |
| JP | 2003-512684 A | 4/2003 |
| JP | 2003-536303 A | 12/2003 |
| JP | 2004-185262 A | 7/2004 |
| JP | 2005-502961 A | 1/2005 |
| JP | 2005-242777 A | 9/2005 |
| JP | 2006-107268 A | 4/2006 |
| JP | 2008-518068 A | 8/2006 |
| JP | 2006-301794 A | 11/2006 |
| JP | 2008-86162 A | 2/2008 |
| JP | 2009-301120 A | 12/2008 |
| JP | 2011-149735 A | 8/2011 |
| JP | 2012-069133 A | 4/2012 |
| JP | 2014-27597 A | 2/2014 |
| WO | 2013/132695 A1 | 9/2013 |
| WO | 2014/004179 A1 | 1/2014 |

OTHER PUBLICATIONS

Jonathan Dowdall et al., "Face Detection in the Near-IR Spectrum", Proc. of Image and Vision Computing, Jul. 1, 2003. vol. 21, No. 7, pp. 565 to 578.
International Search Report for PCT Application No. PCT/JP2014/056756, mailed on Apr. 28, 2014.
Japanese Office Action for JP Application No. 2016-507211 mailed on Jun. 13, 2017, with English Translation.
Extended European Search Report for EP Application No. EP14885448.2 dated on Sep. 22, 2017.
Communication dated Oct. 24, 2017 from the Japanese Patent Office in counterpart application No. 2017-179937.
Japanese Office Action for JP Application No. 2017-179937 mailed on Jan. 16, 2018 with English Translation.
Japanese Office Action for JP Application No. 2017-179938 mailed on Jan. 16, 2018 with English Translation.
Chinese Office Action for CN Application No. 201480077030.0 mailed on Apr. 4, 2018 with English Translation.
Office Action issued May 7, 2019 in corresponding Japanese Application No. 2018-056269.
Pavlidis et al., "The Imaging Issue in an Automatic Face/Disguise Detection System", Proceedings IEEE Workshop on Computer Vision Beyond the Visible Spectrum: Methods and Applications, IEEE, 2000 (10 pages total).
Japanese Office Action for JP Application No. 2020-021111 mailed on Apr. 27, 2021 with English Translation.
Kurode Takuya, "A face recognition monitoring system using near-infrared lights". Forefront of security industry—Security Show 2005, Image laboratory vol. 16, No. 3, Nihon Kogyo Publishing Co., Ltd., Mar. 1, 2005, pp. 48-50, Japan.
Tsuda Takahiro et al., "A proposal of the photograph estimation technique by using infrared rays", IEEJ Transactions C, vol. 124, No. 12, Electron and information system section magazine, Institute of Electrical Engineers of Japan, Dec. 1, 2004, pp. 2446-2453, Japan.
Angelopoulou, "The Reflectance Spectrum of Human Skin", Dec. 1999.
CN Office Action for CN Application No. 201910953455.8. mailed on Jan. 19, 2023 with English Translation.
Angelopoulou, "The Reflectance Spectrum of Human Skin", Dec. 1999. (Year: 1999).
JP Office Action for JP Application No. 2022-118408, mailed on Jul. 25, 2023 with English Translation.

* cited by examiner

DETECTING DEVICE, DETECTING METHOD, AND RECORDING MEDIUM

CROSS-REFERENCE TO RELATED APPLICATIONS

The present application is a continuation application of U.S. patent application Ser. No. 17/503,439 filed on Oct. 18, 2021, which is a continuation application of U.S. patent application Ser. No. 15/124,500 filed on Sep. 8, 2016, which issued as U.S. Pat. No. 11,188,770, which is a National Stage Entry of international application PCT/JP2014/056756, filed Mar. 13, 2014, the disclosures of all of which are incorporated in their entirety by reference herein.

TECHNICAL FIELD

The present disclosure relates to a detecting device, detecting method, and non-transitory recording medium.

BACKGROUND ART

Face authentication techniques for analyzing face images captured by a camera and authenticating the individual (simply termed face authentication hereafter) are known. A problem with such face authentication is unjust authentication in which someone else impersonates an individual by using a photograph of the individual. Moreover, various techniques for preventing unjust authentication due to impersonation are known.

For example, Patent Literature 1 describes a technique of three-dimensional detection using multiple face images for preventing unjust authentication due to impersonation using photographs or the like.

CITATION LIST

Patent Literature

Patent Literature 1: Unexamined Japanese Patent Application Kokai Publication No. 2012-069133.

SUMMARY OF INVENTION

Technical Problem

However, if someone disguises himself as an individual by wearing a sophisticated disguising mask, the figure is three-dimensional and the above three-dimensional detection technique fails to prevent unjust authentication.

Moreover, with recent sophisticated disguising masks, even the human eye sometimes fails to judge whether a disguising mask is worn. For example, at an airport immigration, a person wearing a disguising mask may clear visual matching by an immigration officer by using a forged passport with a photograph of the disguising mask.

In addition to the above case of a disguising mask, similar disguise can be made by using something to disguise that is difficult to visually judge (for example, a sheet of something resembling skin in appearance). In view of such a circumstance, a technique for detecting things to disguise that are difficult to visually judge with high accuracy is demanded.

The present disclosure is made with the view of the above situation and an objective of the disclosure is to provide a detecting device, detecting method, and non-transitory recording medium for detecting things to disguise with high accuracy.

Solution to Problem

In order to achieve the above objective, the detecting device according to a first exemplary aspect of the present disclosure comprises:
an image acquirer acquiring images in multiple different wavelength ranges of reflected light of light emitted at a person; and
a determiner determining whether luminances of a face region in the images acquired by the image acquirer satisfy specific relations different from relations exhibited by skin.

In order to achieve the above objective, the detecting method according to a second exemplary aspect of the present disclosure comprises:
an image acquisition step of acquiring images in multiple different wavelength ranges of reflected light of light emitted at a person; and
a determination step of determining whether luminances of a face region in the images acquired in the image acquisition step satisfy specific relations different from relations exhibited by skin.

In order to achieve the above objective, the non-transitory recording medium according to a third exemplary aspect of the present disclosure saves a program that allows a computer to function as:
a determiner determining whether luminances of a face region in images of a person captured in multiple different wavelength ranges satisfy specific relations different from relations exhibited by skin.

Advantageous Effects of Invention

The present disclosure makes it possible to detect things resembling skin in appearance with high accuracy.

DESCRIPTION OF EMBODIMENTS

Embodiments of the present disclosure will be described in detail hereafter with reference to the drawings.

Embodiment 1

A disguising mask detecting device 1 according to Embodiment 1 of the present disclosure is installed, for example, near an entry gate in an airport immigration area. The disguising mask detecting device 1 has the function of determining whether a person who intends to pass through the entry gate wears a disguising mask and when he wears a disguising mask, giving notice accordingly.

Here, the disguising mask detected by the disguising mask detecting device 1 is a sophisticated mask like those used in special effects makeup for a young actor to play a role of an old man in movies and made of thin silicone resembling human skin in appearance. Therefore, it is difficult for a human to visually judge whether such a disguising mask is worn.

Figure 1:
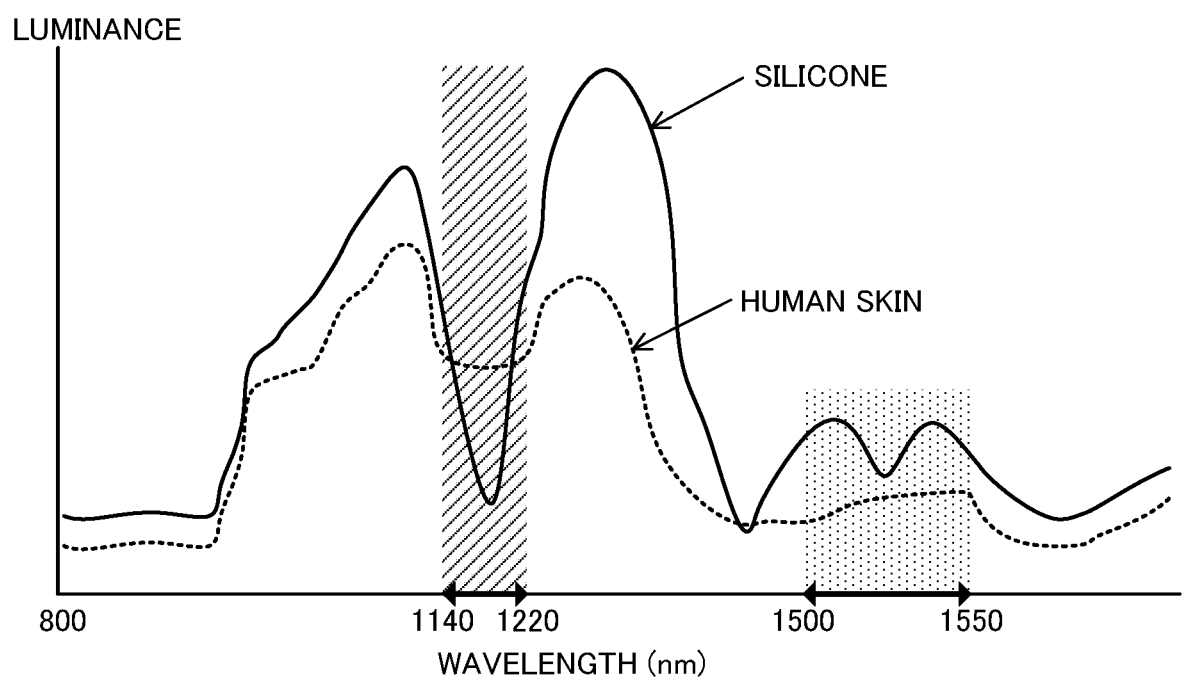
FIG. 1 is a graphical representation showing the spectra of luminances of reflected light when light is emitted at human skin and silicone.

First, the principle of disguising mask detection by the disguising mask detecting device 1 will be described. FIG. 1 is a graphical presentation showing the spectra of luminances of reflected light when light is emitted at objects. In this figure, the dotted line presents the spectrum of reflected light of light emitted at human skin. On the other hand, the solid line presents the spectrum of reflected light of light emitted at silicone. Here, the luminance indicates the degree of brightness.

In this figure, the luminance of reflected light of light emitted at silicone abruptly falls in a wavelength range around 1140 nm to 1220 nm marked by hatched lines, which is an infrared wavelength band, and is obviously different from the luminance of reflected light of light emitted at human skin. Here, an abrupt fall occurs because the silicone absorbs light in the wavelength range marked by the hatched lines well and weakens the reflected light.

The disguising mask detecting device 1 utilizes the above difference in spectrum of luminance of reflected light between silicone and human skin, and detects a disguising mask depending on whether an abrupt fall occurs in the wavelength range marked by the hatched lines.

Figure 2:
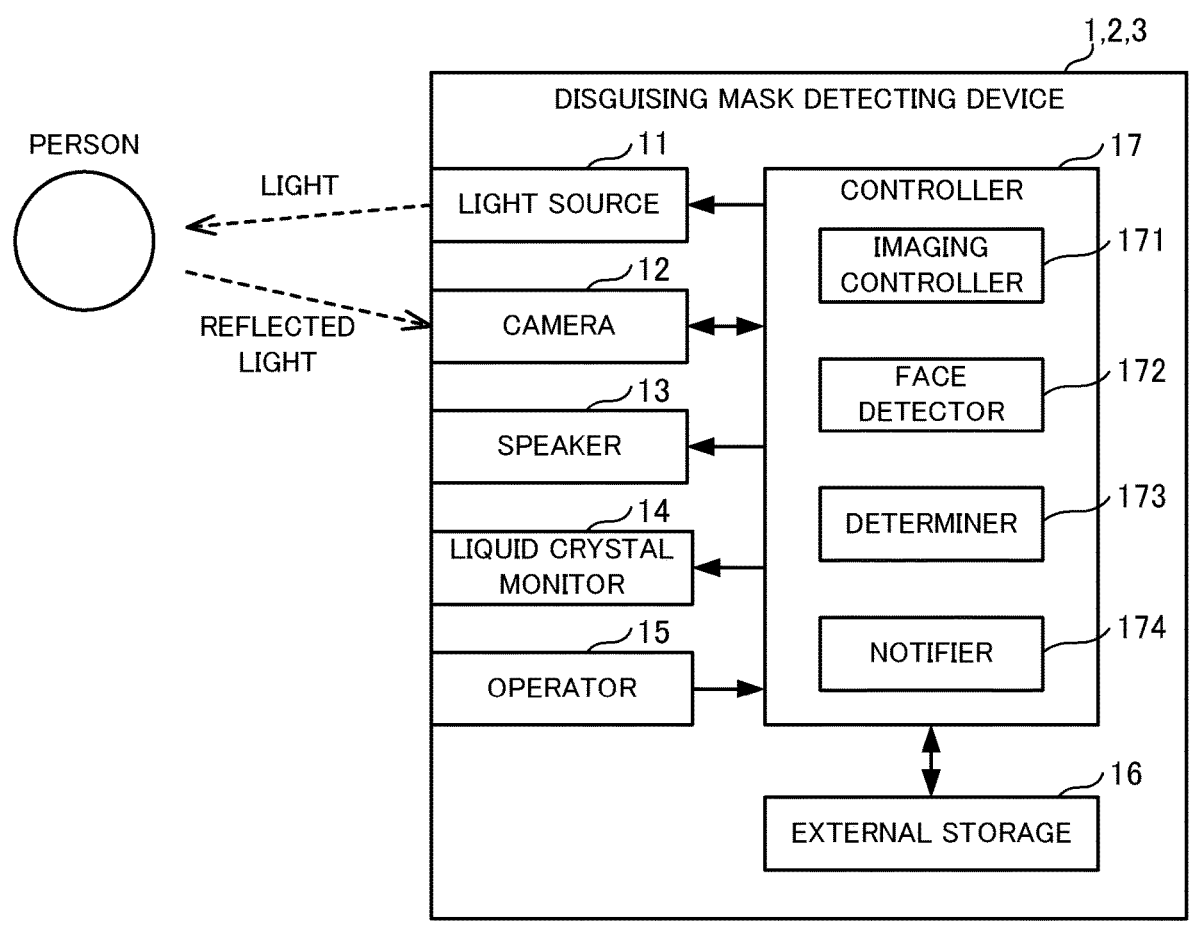
FIG. 2 is a block diagram showing the configuration of the disguising mask detecting device in embodiments.

Subsequently, the configuration of the disguising mask detecting device 1 will be described. The disguising mask detecting device 1 comprises, as shown in FIG. 2, a light source 11, a camera 12, a speaker 13, a liquid crystal monitor 14, an operator 15, an external storage 16, and a controller 17.

The light source 11 is a halogen light source, is turned on/off based on instructions from the controller 17, and emits light at a person who is a subject. Here, the light source 11 may be a strobe or argon bulb. However, a halogen light source includes a lot of constituents in the infrared wavelength band and therefore is suitable for use as the halogen light source 11.

Reflected light of the light emitted at a person by the light source 11 enters the camera 12. The camera 12 captures images of the reflected light in the visible light range, in a wavelength range of 1166±5 nm, in a wavelength range of 1190±5 nm, and in a wavelength range of 1214±5 nm all at once at the same time under the control of the controller 17.

In the following explanation, the image in the visible light range captured by the camera 12 is also referred to as a visible light image; the image in the wavelength range of 1166±5 nm, an infrared image A; the image in the wavelength range of 1190±5 nm, an infrared image B; and the image in the wavelength range of 1214±5 nm, an infrared image C.

Figure 3:
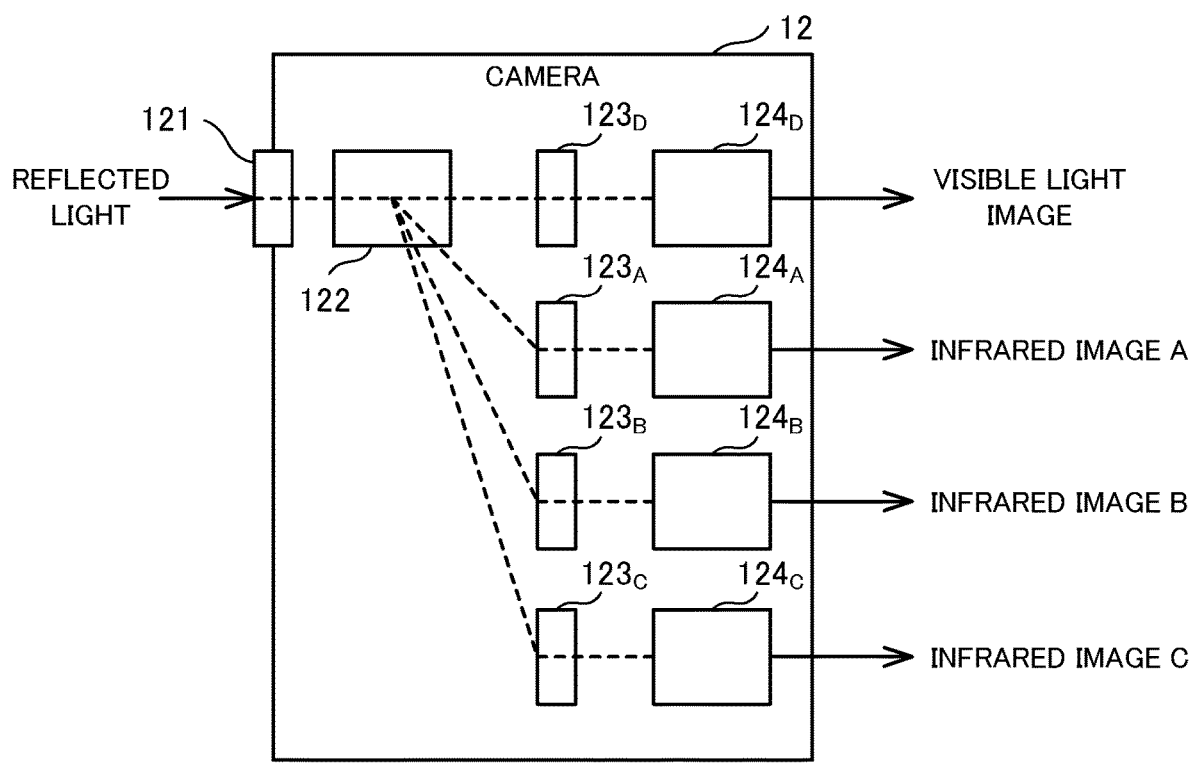
FIG. 3 is a diagram showing the structure of the camera in the embodiments.

The structure of the camera 12 is described here. The camera 12 comprises, as shown in FIG. 3, a lens 121, a beam splitter 122, filters 123 (123$_A$ to 123$_D$) provided corresponding to the above-described wavelength ranges, and complementary metal oxide semiconductor devices (CMOSs) 124 (124$_A$ to 124$_D$).

The lens 121 collects the incident light. The beam splitter 122 is, for example, a prism or one way mirror and splits the light collected by the lens 121. The filters 123 transmit light in the corresponding wavelength ranges in the light split by the beam splitter 122. Specifically, the filters 123$_A$ to 123$_D$ transmit light in the wavelength range of 1166±5 nm, in the wavelength range of 1190±5 nm, in the wavelength range of 1214±5 nm, and in the visible light range, respectively.

Moreover, the CMOSs 124$_A$ to 124$_D$ provided corresponding to the filters 123$_A$ to 123$_D$ convert light transmitted through the filters 123$_A$ to 123$_D$ to electric signals to create images in the corresponding wavelength ranges. Specifically, the CMOSs 124$_A$ to 124$_D$ create infrared images A to C and a visible light image, respectively. Here, image sensors such as charge-coupled devices (CCDs) may be used in place of the CMOSs 124.

Returning to FIG. 2, the speaker 13 outputs sound based on control of the controller 17. The liquid crystal monitor 14 displays various kinds of information based on control of the controller 17. For example, when it is detected that a person is wearing a disguising mask, the controller 17 controls the speaker 13 to output a warning sound for giving notice accordingly and the liquid crystal monitor 14 to display a warning message.

The operator 15 comprises various buttons and when the user conduct an operation, outputs a signal corresponding to the operation to the controller 17.

The external storage 16 is, for example, a hard disc drive or the like, and serves as a temporal storage of images captured by the camera 12 and stores various data necessary for the mask detection procedure described later.

The controller 17 is configured by a central processing unit (CPU), a read only memory (ROM), a random access memory (RAM), and the like, and controls the entire disguising mask detecting device 1. The control procedure of the controller 17 is executed by, specifically, the CPU executing control programs stored in the ROM while using the RAM as the work area to temporarily store various data. The controller 17 functionally comprises an imaging controller 171, a face detector 172, a determiner 173, and a notifier 174.

The imaging controller 171 controls turning-on/turning-off of the light source 11 and imaging operation of the camera 12 so as to acquire images of a person in the wavelength ranges (a visible light image and infrared images A to C).

The face detector 172 analyzes the visible light image captured by the camera 12 and detects a face region of the person. Then, the face detector 172 detects in the face region a forehead region, a right cheek region, and a left cheek region, which are situated near face characteristic quantities (eyes, nose, mouth, and the like) and where the skin is exposed in a relatively large area.

Here, the camera 12 captures the images of a person (a visible light image and infrared images A to C) all at once from the same point and at the same time. Therefore, the regions in the visible light image detected by the face detector 172 share the pixel positions with the regions in the other images (infrared images A to C) captured at the same time.

Here, a known detection method can be used for the face detector 172 to detect the regions.

For example, the face detector 172 applies the Sobel filter to the visible light image to detect outlines and extracts a face outline by face outline pattern matching. Then, the face detector 172 detects eyebrow outlines from above and an outline under the mouth from below within the extracted face outline and detects as a face region a region surrounded by the right and left ends of the face and the positions above the eyebrows and under the mouth. Then, the face detector 172 detects the black points corresponding to the eyeballs in the detected face region as the eye positions and specifies a forehead region, a right cheek region, and a left cheek region from the face region and eye positions based on general face statistical data. Here, the face detector 172 may detect face characteristic quantities such as the eyes, nose, and mouth by a known technique and when those characteristic quantities are detected, specify their neighboring regions as a forehead region, a right cheek region, and a left cheek region.

Figure 4A:
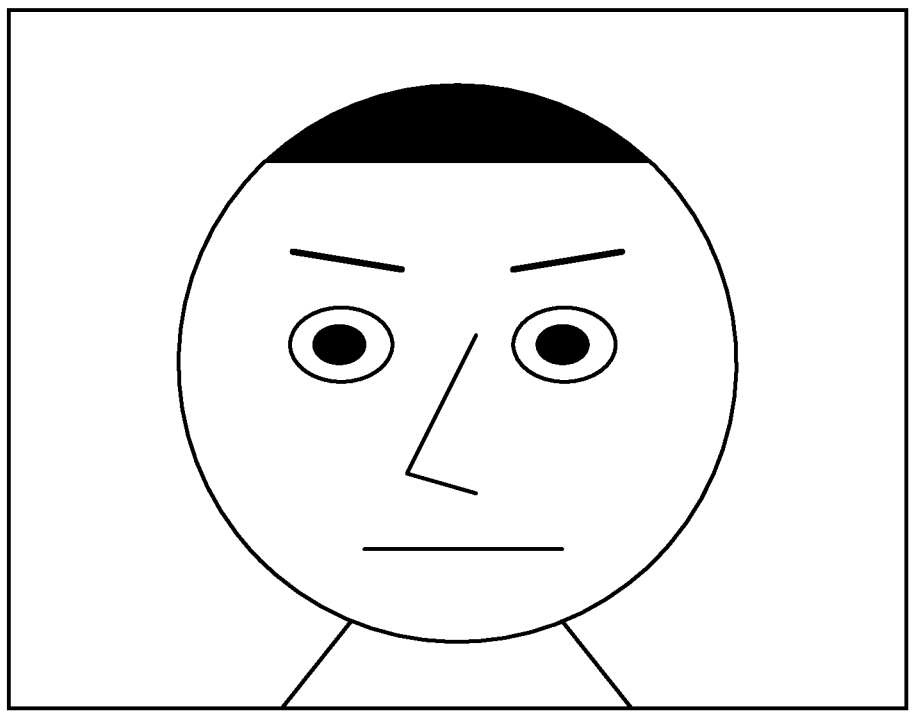
FIG. 4A is an illustration showing an exemplary visible light image.
Figure 4B:
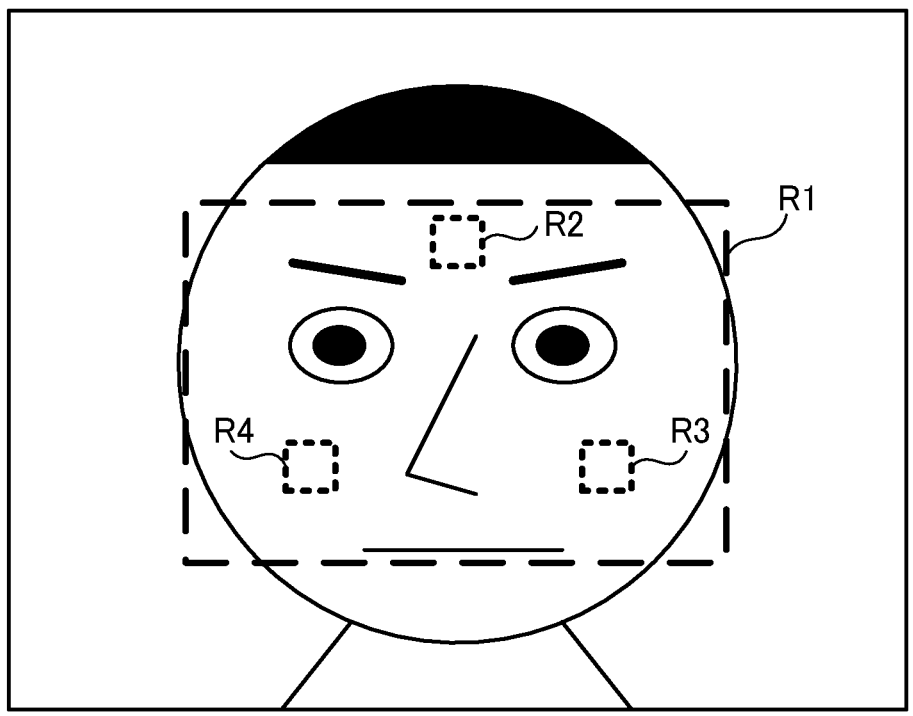
FIG. 4B is an illustration showing regions in the visible light image shown in FIG. 4A.

Here, the above-described processing by the face detector 172 will be described using a specific example. For example, it is assumed that a visible light image as shown in FIG. 4A is given as the processing target of the face detector 172. In such a case, the face detector 172 detects a face region R1 as shown in FIG. 4B. Moreover, the face detector 172 detects a forehead region R2, a right cheek region R3, and a left cheek region R4 from the face region R1.

Returning to FIG. 2, the determiner 173 judges whether the luminances of the regions (the forehead region, right cheek region, and left cheek region) specified by the face detector 172 satisfy specific relations between the infrared images A to C that are different from relations exhibited by skin so as to judge whether there is an abrupt fall in the wavelength range marked by the hatched lines in FIG. 1 and determine whether the person is wearing a disguising mask.

When the determiner 173 determines that a disguising mask is worn, the notifier 174 controls the speaker 13 and liquid crystal monitor 14 to give notice accordingly.

Subsequently, the disguising mask detection procedure executed by the disguising mask detecting device 1 will be described. An immigration officer guides a person entering the country into the field angle of the camera 12 of the disguising mask detecting device 1 installed near an entry gate. In doing so, the officer conducts an operation to start the processing via the operator 15 of the mask detecting device 1. In response to the operation, the controller 17 of the mask detecting device executes the mask detection procedure shown in the flowchart of FIG. 5.

Here, the disguising mask detecting device 1 may comprise a motion sensor and when the motion sensor detects a person entering the country, execute the mask detection procedure. Alternatively, with the camera 12 set in the live view mode, the mask detection procedure may be executed automatically when the controller 17 determines that a person is on camera.

Moreover, a person wearing a disguising mask may become cautious when he sees the lens of the camera 12 or the like. Therefore, for example, a magic mirror may be placed in front of the camera 12 so that the mask detection procedure starts with an image captured unnoticeably.

Figure 5:
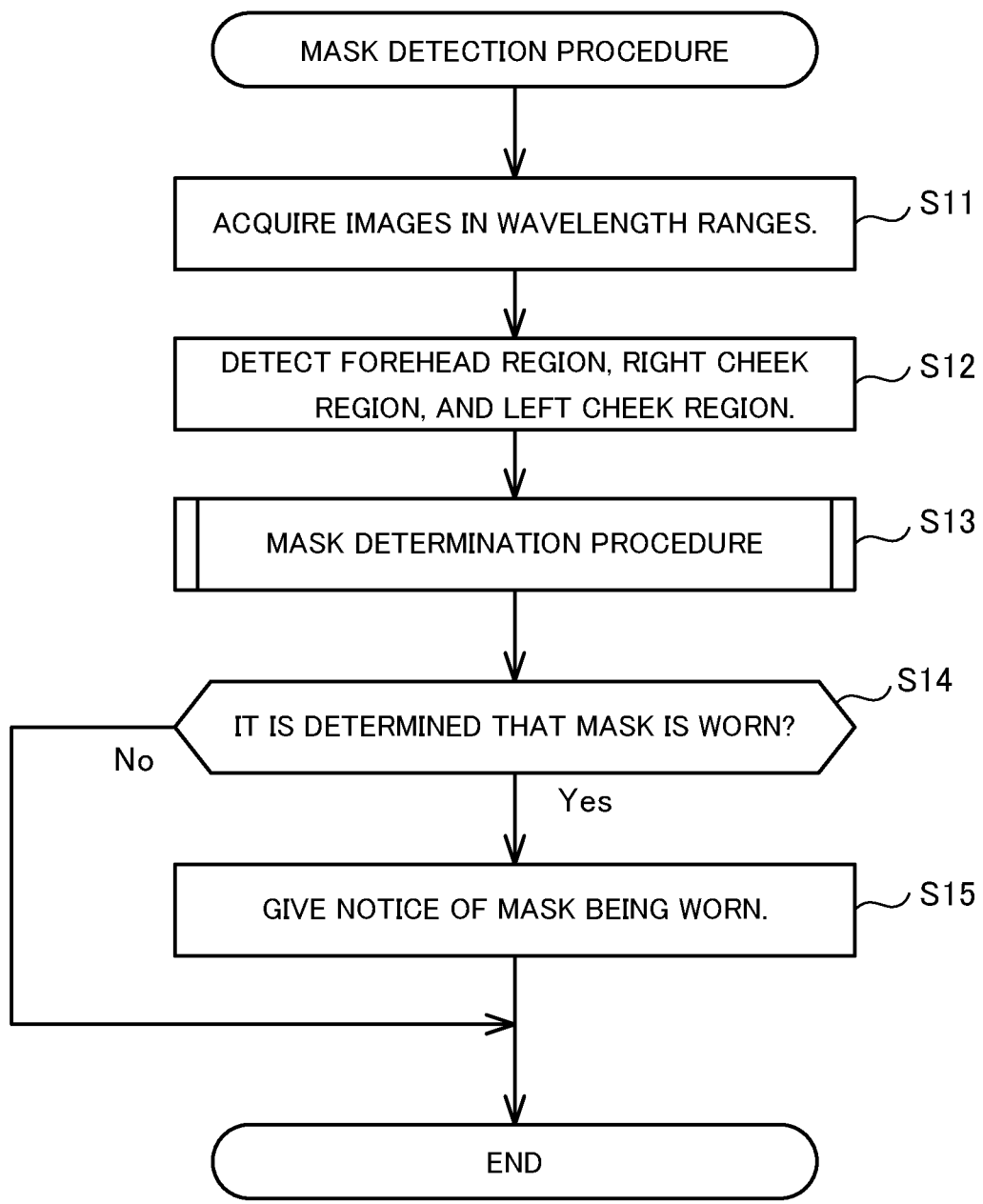
FIG. 5 is a flowchart showing an exemplary process flow of the mask detection procedure.

In the mask detection procedure of FIG. 5, first, the imaging controller 171 turns on the light source 11 and controls the camera 12 to acquire images of the person in the wavelength ranges (a visible light image and infrared images A to C) (Step S11).

Subsequently, the face detector 172 detects a face region from the acquired visible light image and detects a forehead region, a right cheek region, and a left cheek region from the face region (Step S12).

Subsequently, the determiner 173 compares the luminances of the regions (forehead region, right cheek region, and left cheek region) in the infrared images A to C acquired at the same time as the visible light image in the Step S11 so as to execute the mask determination procedure to determine whether the person is wearing a disguising mask (Step S13).

Figure 6:
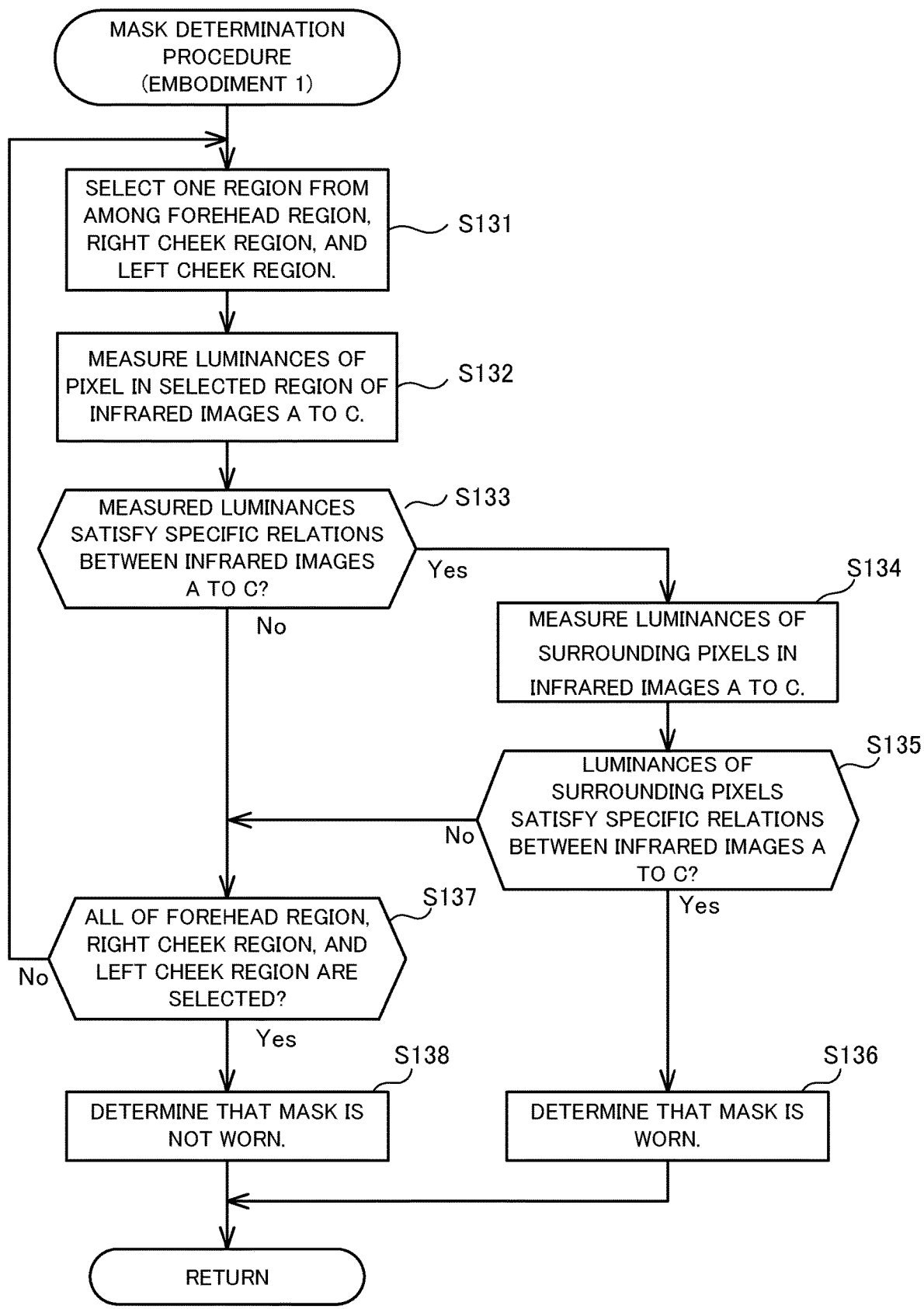
FIG. 6 is a flowchart showing an exemplary process flow of the mask determination procedure in Embodiment 1.

Here, details of the mask determination procedure will be described with reference to the flowchart of FIG. 6.

First, the determiner 173 selects one of the regions unselected in the ongoing mask determination procedure from among the detected forehead region, right cheek region, and left cheek region (Step S131). The region selected in the Step S131 is also referred to as the selected region hereafter.

Subsequently, the determiner 173 selects one pixel from the selected region (for example, the pixel at the center of the selected region) and measures the luminance of the pixel in each of the infrared images A to C (Step S132).

Subsequently, the determiner 173 judges whether the measured luminances satisfy specific relations between the infrared images A to C (Step S133). Specifically, the determiner 173 judges the luminance measured in the infrared image B is lower than the luminances measured in the infrared image A and infrared image C by a given rate. As a result, it is possible to judge whether there is an abrupt fall in luminance of reflected light in the silicone-specific wavelength range (the wavelength range around 1140 nm to 1220 nm shown in FIG. 1) that is not observed with human skin.

Here, more specifically, the determiner 173 has only to judge whether the following relational expressions (1) to (3) are all satisfied in the Step S133. Here, in the relational expressions (1) to (3), IA is the luminance measured in the infrared image A, IB is the luminance measured in the infrared image B, and IC is the luminance measured in the infrared image A. Moreover, T1 to T3 are coefficients and preset to numerical values optimum for the mask detection based on image capturing conditions.

$$IA \times T1 > IB \tag{1}$$

$$IC \times T2 > IB \tag{2}$$

$$IC \times T3 > IA \tag{3}$$

If the above relational expressions (1) and (2) are satisfied, the luminance measured in the infrared image B is lower than the luminances measured in the infrared image A and infrared image C by a given rate. Moreover, if the above relational expression (3) is satisfied, the luminance measured in the infrared image C is higher than the luminance measured in the infrared image A by a given rate.

If the measured luminances satisfy the specific relations (Step S133; Yes), the determiner 173 measures, in each of the infrared images A to C, the luminances of eight pixels surrounding the pixel measured in the Step S132 (Step S134).

Subsequently, the determiner 173 judges whether the measured luminances of the surrounding pixels also satisfy the specific relations between the infrared images A to C (Step S135).

If the luminances of the surrounding pixels also satisfy the specific relations (Step S135; Yes), the determiner 173 determines that the person is wearing a disguising mask (Step S136) and the mask determination procedure ends. Here, in the above-described mask determination procedure, it is determined that a disguising mask is worn when one pixel and eight pixels surrounding that pixel in any one of the selected regions (forehead, right cheek, and left cheek) all satisfy the specific relations. This is because a disguising mask is generally worn to cover the entire face and if an abrupt fall in luminance in the specific wavelength range is observed in any one of the selected regions, it is possible to determine that a disguising mask is worn without executing the mask determination procedure on the other selected regions.

On the other hand, if the luminance of one pixel in the selected region does not satisfy the specific relations (Step S133; No) or the luminances of the surrounding pixels do not satisfy the specific relations (Step S135; No), the determiner 173 judges whether all of the forehead region, right cheek region, and left cheek region are selected in the ongoing mask determination procedure (Step S137).

If not all of the forehead region, right cheek region, and left cheek region are selected (Step S137; No), the processing returns to the Step S131 and the determiner 173 selects an unselected region and repeats a series of processing to judge whether the luminances of pixels in that region satisfy the specific relations so as to determine whether a disguising mask is worn.

On the other hand, if all of the forehead region, right cheek region, and left cheek region are selected (Step S137; Yes), the determiner 173 determines that the person is not wearing a disguising mask (Step S138) and the mask determination procedure ends.

Returning to FIG. 5, after the mask determination procedure (Step S13) ends, the notifier 174 judges whether it is determined in the mask determination procedure that a disguising mask is worn (Step S14). If a disguising mask is not worn (Step S14; Yes), the disguising mask detection procedure ends.

On the other hand, if a disguising mask is worn (Step S14; Yes), the notifier 174 controls the speaker 13 and liquid crystal monitor 14 to give notice accordingly (Step S15). As a result, the officer can notice the disguise of the person trying to pass through the entry gate, thereby preventing illegal entry. Then, the disguising mask detection procedure ends.

As described above, the disguising mask detecting device 1 according to Embodiment 1 acquires (captures) images of a person in multiple different wavelength ranges and when the luminances of the face region satisfy specific relations between the acquired images that are different from relations exhibited by skin, judges that the person is wearing a disguising mask. In other words, the disguising mask detecting device 1 according to Embodiment 1 judges that a person is wearing a disguising mask when a concave shape is formed by connecting the luminances of the face region in the acquired images. As a result, highly accurate detection of a disguising mask with the use of the difference in spectrum of luminance of reflected light between silicone and human skin is made possible.

Moreover, the disguising mask detecting device 1 according to Embodiment 1 detects characteristic regions where the skin is exposed in a relatively large area (forehead region, right cheek region, and left cheek region) from the face region in the acquired images and detects a disguising mask using the luminances of the characteristic regions. Therefore, the mask determination procedure does not need to be executed on the entire face region, whereby the mask detection processing load is reduced.

Moreover, the disguising mask detecting device 1 according to Embodiment 1 judges whether a disguising mask is worn using not only the luminance of one pixel but also the luminances of pixels surrounding that pixel. Therefore, more accurate detection of a disguising mask is made possible.

Moreover, the disguising mask detecting device 1 according to Embodiment 1 detects the presence/absence of a disguising mask with a camera using images in four different wavelength ranges (a visible light image and infrared images A to C), whereby detection of a disguising mask with a relatively small load is made possible.

Moreover, the light source 11 of the disguising mask detecting device 1 according to Embodiment 1 is a halogen light source and therefore a sufficient amount of light in the infrared band can be obtained. Therefore, highly accurate detection of a disguising mask is made possible.

Embodiment 2

Subsequently, a disguising mask detecting device 2 according to Embodiment 2 will be described. Here, as shown in FIG. 3, the disguising mask detecting device 2 is substantially the same in configuration of components as the disguising mask detecting device 1 according to Embodiment 1 and different only in the contents of the mask determination procedure.

Figure 7:
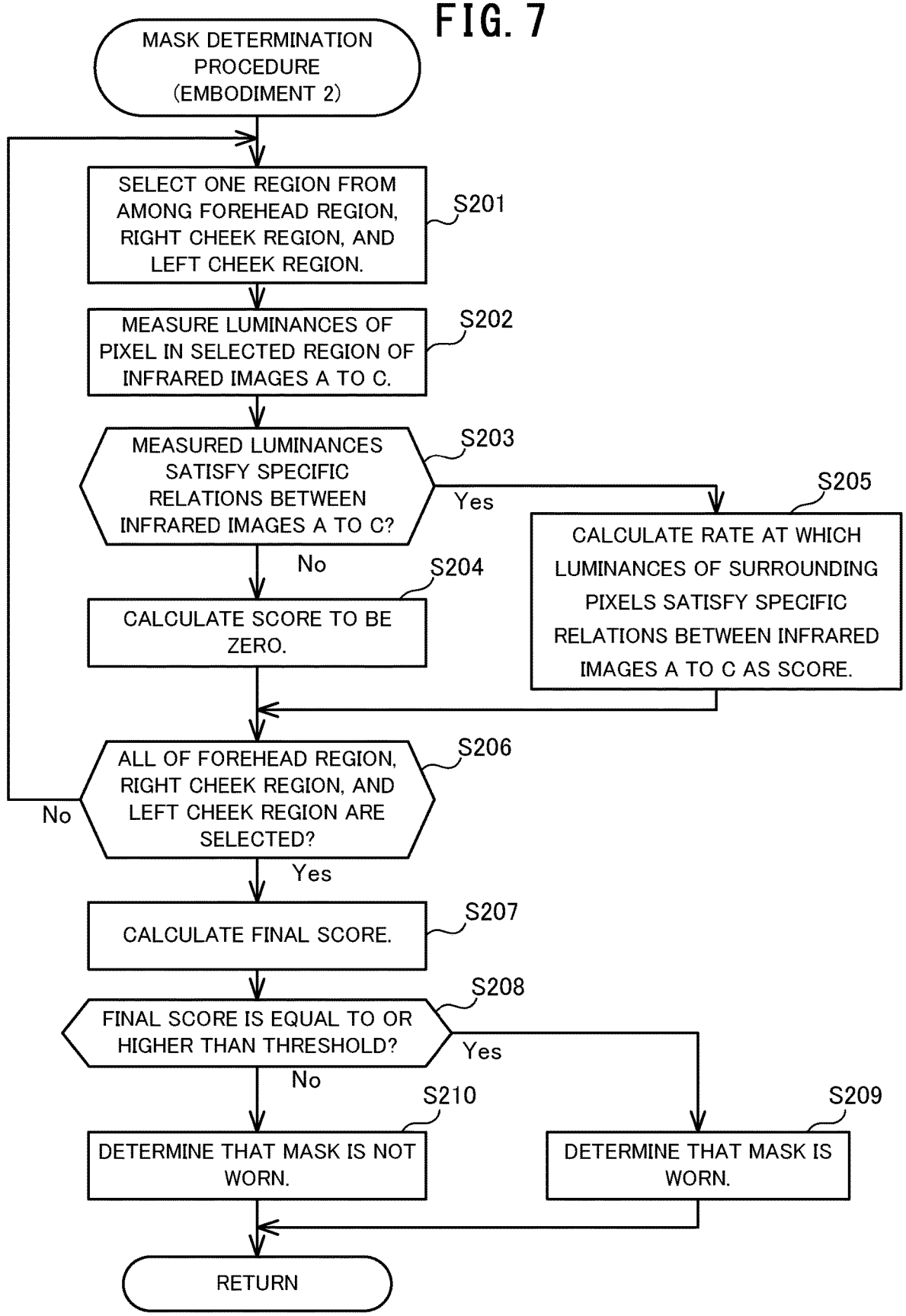
FIG. 7 is a flowchart showing an exemplary process flow of the mask determination procedure in Embodiment 2.

The mask determination procedure executed by the mask detecting device 2 will be described using the flowchart of FIG. 7. Here, as for the steps of which the contents are substantially the same as in the mask determination procedure shown in FIG. 6, their explanation will be simplified as appropriate. Moreover, the timing of starting the mask determination procedure in FIG. 7 is the same as in FIG. 6.

As the mask determination procedure starts, first, the determiner 173 selects an unselected region from among the detected forehead region, right cheek region, and left cheek region (Step S201), selects one pixel in the selected region and measures the luminance of the pixel in each of the infrared images A to C (Step S202), and judges whether the measured luminances satisfy the specific relations between the infrared images A to C (Step S203).

If the luminances do not satisfy the specific relations between the infrared images A to C (Step S203; No), the determiner 173 calculates a mask determination score of the selected region to be zero (Step S204) and the processing advances to Step S206.

On the other hand, if the luminances satisfy the specific relations between the infrared images A to C (Step S203; Yes), the determiner 173 measures, in each of the infrared images A to C, the luminances of pixels surrounding the pixel measured in the Step S202 (for example, eight pixels neighboring the measured pixel). Then, the determiner 173 calculates the rate at which the luminances of the surrounding pixels satisfy the specific relations between the infrared images A to C as a score of the selected region (Step S205), and the processing advances to the Step S206. For example, if the luminances of all eight surrounding pixels satisfy the specific relations between the infrared images A to C, the score is calculated to be 1 (8/8). On the other hand, if the luminances of two of the eight surrounding pixels satisfy the specific relations between the infrared images A to C, the score is calculated to be 0.25 (2/8).

In the Step S206, the determiner 173 judges whether all of the forehead region, right cheek region, and left cheek region are selected. If not all of the forehead region, right cheek region, and left cheek region are selected (Step S206; No), the processing returns to the Step S201.

If all of the forehead region, right cheek region, and left cheek region are selected (Step S206; Yes), the determiner 173 calculates the average of the scores calculated for the regions as the final score (Step S207). Then, the determiner 173 judges whether the final score is equal to or higher than a given threshold (for example, 0.5) (Step S208).

If the final score is equal to or higher than the threshold (Step S208; Yes), the determiner 173 determines that the person is wearing a disguising mask (Step S209). On the other hand, if the final score is lower than the threshold (Step S208; No), the determiner determines that the person is not wearing a disguising mask (Step S210). Then, the mask determination procedure ends.

As described above, in the mask determination procedure of Embodiment 2, a disguising mask determination score is calculated for each of the right cheek region, left cheek region, and forehead region and it is determined whether a disguising mask is worn. Therefore, it is possible to detect a disguising mask with higher accuracy than the mask determination procedure of Embodiment 1 in which it is immediately determined that a disguising mask is worn when the luminances of any one of the regions (cheek region, right cheek region, and left cheek region) satisfy the specific relations.

Embodiment 3

Subsequently, a disguising mask detecting device 3 according to Embodiment 3 will be described. Here, as shown in FIG. 3, the disguising mask detecting device 3 is substantially the same in configuration of components as the disguising mask detecting devices 1 and 2 according to Embodiments 1 and 2 and different only in the contents of the mask determination procedure.

Figure 8:
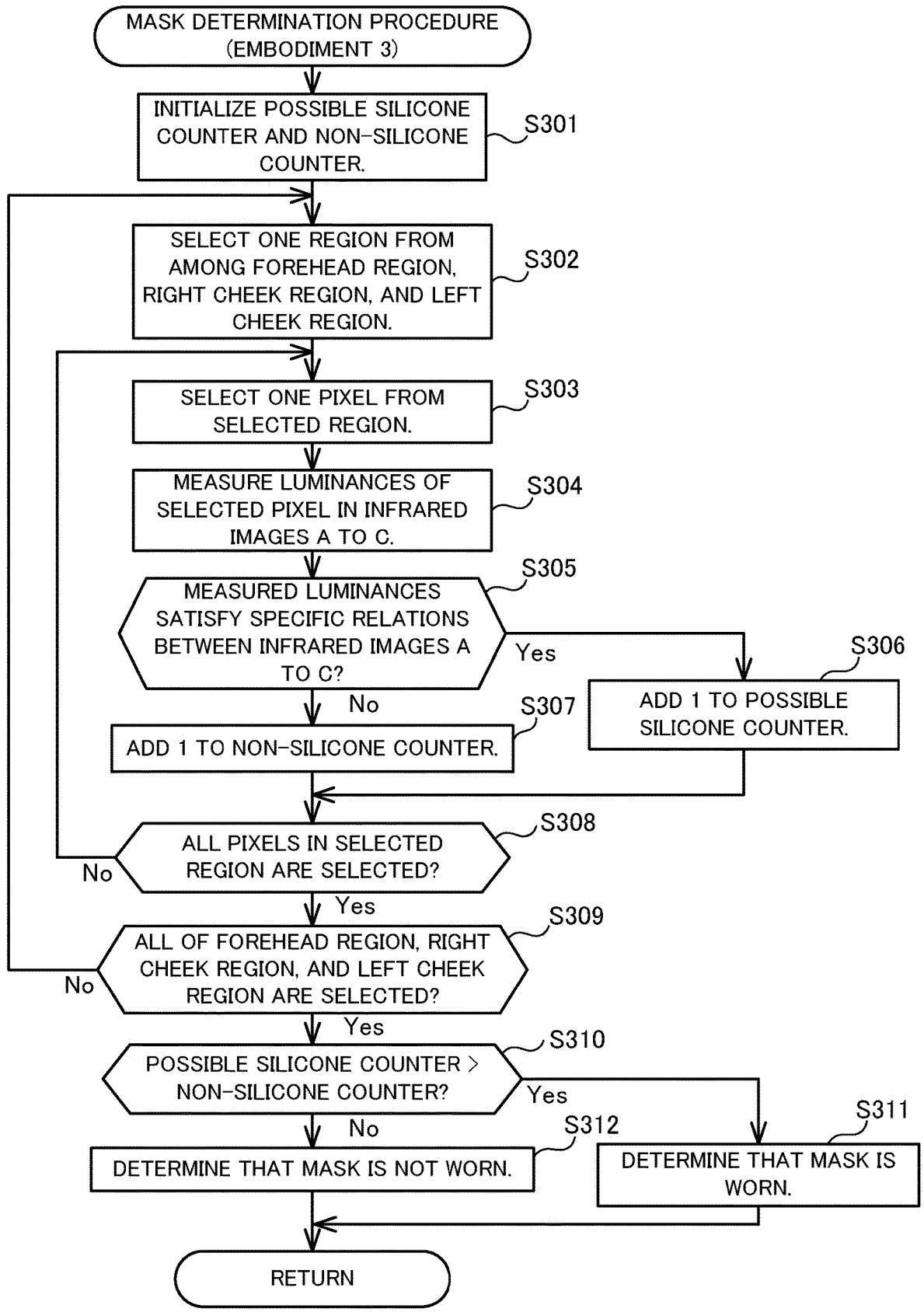
FIG. 8 is a flowchart showing an exemplary process flow of the mask determination procedure in Embodiment 3.

The mask determination procedure executed by the mask detecting device 3 will be described using the flowchart of FIG. 8. Here, as for the steps of which the contents are substantially the same as in the mask determination procedure shown in FIG. 6, their explanation will be simplified as appropriate. Moreover, the timing of starting the mask determination procedure in FIG. 8 is the same as in FIG. 6.

As the mask determination procedure starts, first, the determiner 173 initializes a possible silicone counter and non-silicone counter used in disguising mask determination to zero (Step S301).

Subsequently, the determiner 173 selects one of the forehead region, right cheek region, and left cheek region (Step S302). Then, the determiner 173 selects one of the unselected pixels in the selected region (Step S303). The pixel selected in the Step S303 is also referred to as the selected pixel hereafter.

Subsequently, the determiner 173 measures the luminance of the selected pixel in each of the infrared images A to C (Step S304). Then, the determiner 173 judges whether the measured luminances satisfy the specific relations between the infrared images A to C (Step S305).

If the measured luminances satisfy the specific relations (Step S305; Yes), the determiner adds one to the possible silicone counter (Step S306). On the other hand, if the measured luminances do not satisfy the specific relations (Step S305; No), the determiner adds one to the non-silicone counter (Step S307).

Subsequently, the determiner 173 determines whether all pixels in the selected region are selected (Step S308).

If not all pixels are selected (Step S308; No), the processing returns to the Step S303 and the determiner 173 selects one pixel from the selected region and repeats the process to add one to the non-silicone counter or to the possible silicone counter based on the luminances of the pixel.

On the other hand, if all pixels are selected (Step S308; Yes), the determiner 173 judges whether all of the forehead region, right cheek region, and left cheek region are selected (Step S309). If not all of the forehead region, right cheek region, and left cheek region are selected (Step S309; No), the processing returns to the Step S302.

If all of the forehead region, right cheek region, and left cheek region are selected (Step S309; Yes), in other words after the possible silicone counter or non-silicone counter is incremented for each of all pixels in the forehead region, right cheek region, and left cheek region, the determiner 173 judges whether the possible silicone counter has a higher value than the non-silicone counter (Step S310).

If the possible silicone counter has a higher value than the non-silicone counter (Step S310; Yes), the determiner 173 determines that the person is wearing a disguising mask (Step S311).

On the other hand, if the possible silicone counter does not have a higher value than the non-silicone counter (Step S310; No), the determiner 173 determines that the person is not wearing a disguising mask (Step S312). Then, the disguising mask determination procedure ends.

As described above, in the mask determination procedure of Embodiment 3, all pixels in the forehead region, right cheek region, and left cheek region are used to determine a disguising mask, whereby it is possible to detect a disguising mask with higher accuracy.

Here, in the mask detection procedure of FIG. 8, it may be possible to use only the possible silicone counter and detect a mask based on whether the possible silicone counter has a value equal to or higher than a given value in the Step S310. For example, with the given value set to 80% of all pixels in the forehead region, right cheek region, and left cheek region, it is possible to judge that a mask is worn when 80% or more of all pixels are of possible silicone.

Moreover, in the mask detection procedure of FIG. 8, the possible silicone counter is increased by one in the Step S306 when the luminances of the selected pixel satisfy the specific relations (Step S305; Yes). However, it may be possible that when the luminances of the selected pixel satisfy the specific relations, it is determined as in Embodiment 1 whether the surrounding pixels satisfy the specific relations and only if satisfying, the possible silicone counter is increased by one.

Modified Embodiments

The present disclosure is not confined to the above embodiments and needless to say, various changes can be made to the extent of not departing from the gist of the present disclosure.

For example, the disguising mask detecting devices 1 to 3 according to the above-described embodiments eventually detect a disguising mask. However, the present disclosure is applicable to a detecting device detecting a thing to disguise attached to the skin, which is not necessarily a disguising mask.

Moreover, in the disguising mask detecting devices 1 to 3 according to the above-described embodiments, the determiner 173 determines whether a person is wearing a disguising mask in the mask determination procedure. However, it may be possible that without the determination itself as to whether a disguising mask is worn, the determiner 173 determines only whether the luminances satisfy the specific relations between the infrared images and if satisfying, the notifier 174 gives notice accordingly.

Moreover, the disguising mask detecting devices 1 to 3 shown in FIG. 2 are described on the assumption that the light source 11, camera 12, and the like are all integrated. Needless to say, they may be separated as appropriate. For example, the light source 11, camera 12, speaker 13, and the like may be separately prepared and combined with a device having the function of the controller 17 (for example, a PC or the like) to configure the disguising mask detecting devices 1 to 3. Alternatively, it may be possible that the function of the controller 17 is built in the camera 12 and the controller of the camera 12 works together with the light source 11, speaker 13, and the like as appropriate to configure the disguising mask detecting device 1.

Moreover, in the above-described embodiments, it is determined that a disguising mask is worn when the luminances of an image in a wavelength range of 1166±5 nm (infrared image A), an image in a wavelength range of 1190±5 nm (infrared image B), and an image in a wavelength range of 1214±5 nm (infrared image C) satisfy the specific relations.

However, the presence/absence of a disguising mask may be determined using images in other wavelength ranges as long as change in luminance of reflected light different from human skin can be detected. For example, obvious difference in spectrum of luminance of reflected light between silicone and human skin is observed in a wavelength range around 1500 nm to 1550 nm marked by a shaded area in FIG. 1. Therefore, it may be possible to prepare multiple filters for the wavelength range in the shaded area, acquire multiple images of a person, and determine the presence/absence of a disguising mask from the luminances of the face region. Moreover, images in the wavelength ranges both in the hatched area and in the shaded area may be used in the mask detection procedure and in such a case, the accuracy of detecting a mask can be improved.

Moreover, in the above-described embodiments, the luminances of images in three wavelength ranges (infrared images A to C) are used to determine the presence/absence of a disguising mask. The luminances of images in three or more wavelength ranges may be used to determine the presence/absence of a disguising mask.

Moreover, in the above-described embodiments, the face detector 172 detects a forehead region, a right cheek region, and a left cheek region from the face region, and the determiner 173 compares the luminances of the regions in the images to determine the presence/absence of a disguising mask. However, the face detector 172 does not need to detect all of a forehead region, right cheek region, and left cheek region, and has only to detect at least one region. For example, it may be possible that the face detector 172 detects only a forehead region and the determiner 173 compares only the luminances of the forehead region to determine the presence/absence of a disguising mask. Moreover, it may be possible that the face detector 172 detects a characteristic region other than the forehead region, right cheek region, and left cheek region and the luminances of that region are used to determine the presence/absence of a disguising mask. Moreover, it may be possible that the face detector 172 detects only a face region and the determiner 173 compares the luminances of the entire face region or a part thereof to determine the presence/absence of a disguising mask.

Moreover, when the positions of the camera 12 and 13 and the point of photographing a person are fixed so that the face of the person definitely appears in a specific area of the image, the determiner 173 may compare the luminances of that specific area to determine the presence/absence of a disguising mask. In such a case, the disguising mask detecting devices 1 to 3 do not need to comprise the face detector 171.

Moreover, in the above-described embodiments, as shown in FIG. 3, the camera 12 of the disguising mask detecting device 1 comprises the beam splitter 122 and multiple filters 123, whereby multiple images in different wavelength ranges can be captured at a time.

Figure 9:
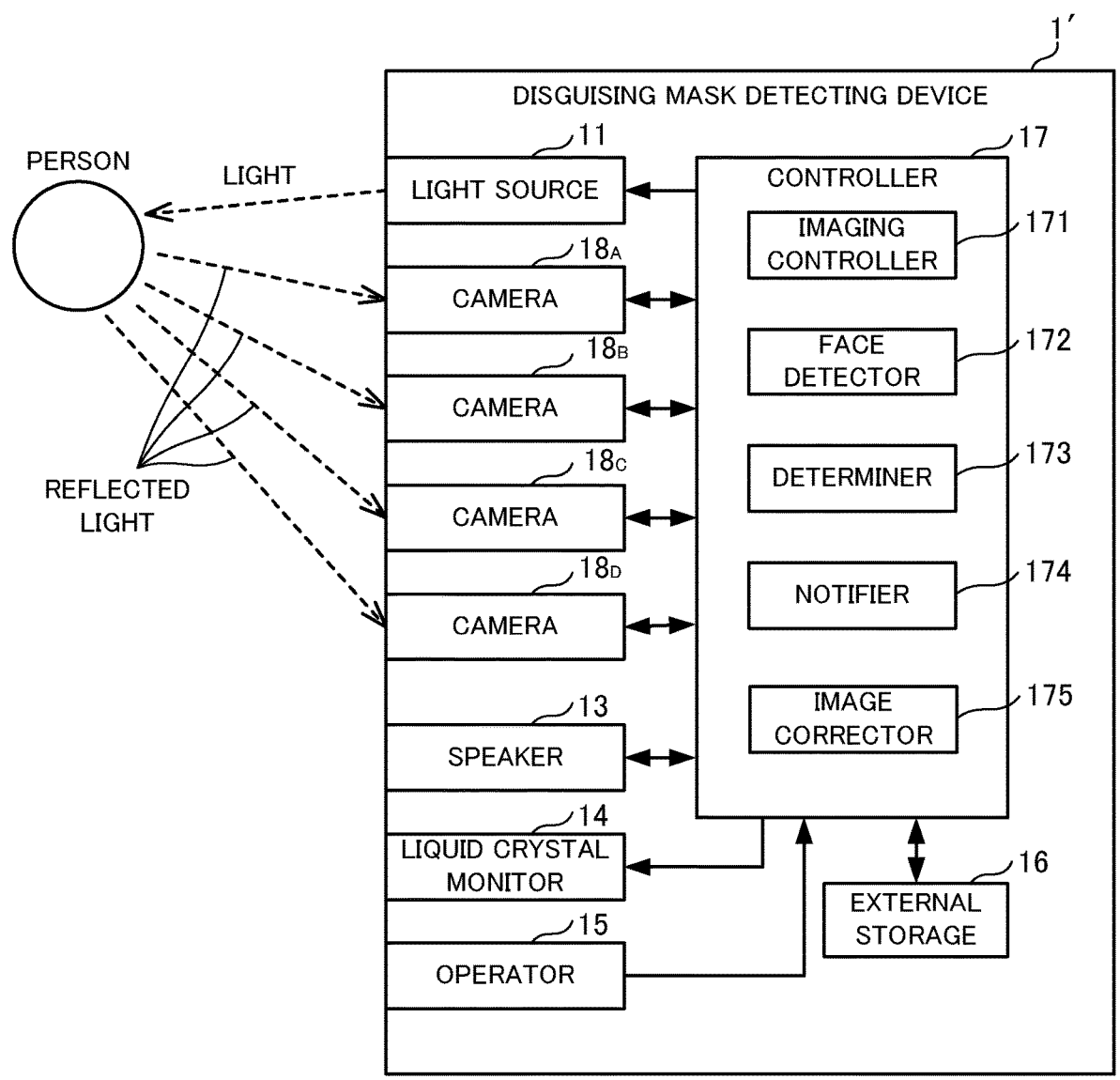
FIG. 9 is a block diagram showing another exemplary configuration of the disguising mask detecting device 1 shown in FIG. 2.

However, the present disclosure is applicable even to a disguising mask detecting device 1' comprising, as shown in FIG. 9, four cameras 18 ($18_A$ to $18_D$) capturing only an image in a single wavelength range in place of such a camera 12. Here, the cameras $18_A$ to $18_D$ each comprise a filter allowing light only in a wavelength range of 1166±5 nm, in a wavelength range of 1190±5 nm, in a wavelength range of 1214±5 nm, and in the visible light range, respectively, to transmit through the CMOS. Therefore, the cameras $18_A$ to $18_D$ can capture only infrared images A to D and a visible light image, respectively.

Here, the external storage 16 of the disguising mask detecting device 1' stores position parameters presenting the positional relations of the cameras $18_A$ to $18_D$. The position parameters are information presenting, for example, the relative position coordinates (x, y, z), vertical angle (tilt), horizontal angle (pan), rotational angle (roll), and the like of the cameras $18_A$ to $18_D$.

In the disguising mask detecting device 1', as shown in FIG. 9, the angles of reflected light from the person are different; therefore, the images in the wavelength ranges are not those captured at one and the same point. Then, when the luminances of a selected pixel in the infrared images A to C are measured in the mask determination procedure, the position of the pixel is not the same.

Therefore, in the disguising mask detecting device 1', the controller 17 comprises an image corrector 175 acquiring images in which the images captured by the multiple cameras $18_A$ to $18_D$ are corrected as if the person was photographed at one and the same point.

For example, using a known technique, the image corrector 175 angularly-corrects the images captured at the positions of the cameras $18_A$ to $18_D$ so that they are at the same position as the image captured at the position of the camera $18_A$ with reference to the position parameters stored in the external storage 16. As a result, images sharing the pixel positions can be obtained. Then, the face detector 172 and determiner 173 can execute the mask detection procedure on the sharing images obtained by the image corrector 175.

The disguising mask detecting device 1' allows for use of cameras simpler in structure than the camera 12 of the disguising mask detecting device 1 using the beam splitter 122 and multiple filters $123_A$ to $123_D$, whereby the disguising mask detecting device 1' can inexpensively be configured.

Moreover, the above-described embodiments are described using a case of detecting a disguising mask. Skin may be detected along with detection of a disguising mask. In such a case, relational expressions for detecting skin are obtained in advance and it is determined whether it is skin with the obtained relational expressions along with determination of whether the luminances of a selected pixel in the infrared images A to C satisfy the specific relations, whereby it is possible to detect whether the pixel is of silicone or of skin. Therefore, it is possible to determine whether a disguising mask is worn with higher accuracy.

Moreover, in the disguising mask detecting devices 1 to 3 in the above-described embodiments, the filters $123_A$ to $123_D$ that are bandpass filters transmitting light in the wavelength ranges are used. This is not restrictive and other filters may be used. Images in desired wavelength ranges may be obtained by, for example, using a cutoff filter cutting off all infrared light in order to obtain a visible light image or combining multiple filters in order to obtain images in multiple different wavelength ranges in the infrared band (for example, combining a cutoff filter cutting off light of 1160 nm or shorter and a cutoff filter cutting off light of 1172 nm or longer in order to obtain an image in a wavelength range of 1166±5 nm).

Moreover, the above-described embodiments are described using a case of installing the disguising mask detecting devices 1 to 3 in an immigration area. The place where the disguising mask detecting devices 1 to 3 are installed is not restricted to this. The bottom line is, the disguising mask detecting device 1 can be installed to detect a disguising mask where a disguising mask has to be detected. For example, the disguising mask detecting devices 1 to 3 may be installed for use near, evidently, a departure gate in an immigration area or at an entrance to a company or large-scale leisure facility.

Moreover, in the above-described embodiments, the disguising mask detecting devices 1 to 3 detect a silicone disguising mask. The present disclosure can be used for detecting a disguising mask made of some other material. In such a case, it is necessary to acquire multiple images in wavelength ranges in which the spectrum of luminance of reflected light is largely different between the disguising mask material and human skin.

For example, a resin mask exhibits high luminance in a wavelength range of 1480 to 1580 nm while human skin exhibits low luminance in this wavelength range. Moreover, a synthetic rubber mask exhibits extremely lower luminance in a wavelength range of 1480 to 1580 nm than human skin. Therefore, taking into account such difference between the skin and other material, it is possible to detect a resin or synthetic rubber mask.

Moreover, it is possible to apply operation programs defining the operation of the disguising mask detecting devices 1 to 3 according to the above-described embodiments to an existing personal computer, information terminal device, or the like to allow the personal computer or the like to function as the disguising mask detecting devices 1 to 3 according to the present disclosure.

Moreover, such programs are distributed by any method and, for example, may be saved and distributed on a non-transitory computer-readable recording medium such as a compact disk read only memory (CD-ROM), digital versatile disk (DVD), magneto-optical disk (MO), and memory card or distributed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The above-described embodiments are entirely or partly, but not exclusively, described as in the following Supplementary Notes.

(Supplementary Note 1)

A detecting device, comprising:

an image acquirer acquiring images in multiple different wavelength ranges of reflected light of light emitted at a person; and a determiner determining whether luminances of a face region in the images acquired by the image acquirer satisfy specific relations different from relations exhibited by skin.

(Supplementary Note 2)

The detecting device according to Supplementary Note 1, wherein the determiner determines that the person is wearing a disguise when the specific relations are satisfied.

(Supplementary Note 3)

The detecting device according to Supplementary Note 1 or 2, wherein the image acquirer acquires multiple images in different wavelength ranges within an infrared band, and the determiner determines that the specific relations are satisfied when a waveform presented by distribution of the luminances of the face region in the images is concave.

(Supplementary Note 4)

The detecting device according to any one of Supplementary Notes 1 to 3, wherein the image acquirer acquires images in wavelength ranges around 1166 nm, around 1190 nm, and around 1214 nm separately, and the determiner determines that the specific relations are satisfied when the luminance of the face region in the image in the wavelength range around 1190 nm is lower than the luminances of the face region in the images in the wavelength ranges around 1166 nm and around 1214 nm by a given rate.

(Supplementary Note 5)

The detecting device according to any one of Supplementary Notes 1 to 3, wherein the image acquirer acquires images in wavelength ranges around 1166 nm, around 1190 nm, and around 1214 nm, and the determiner determines that the specific relations are satisfied when the luminance of the face region in the image in the wavelength range around 1190 nm is lower than the luminances of the face region in the images in the wavelength ranges around 1166 nm and around 1214 nm by a given rate and the luminance within the face region in the image in the wavelength range around 1214 nm is higher than the luminance of the face region in the image in the wavelength range around 1166 nm by a given rate.

(Supplementary Note 6)

The detecting device according to any one of Supplementary Notes 1 to 5, comprising:

a face detector detecting a face region of the person from the images acquired by the image acquirer, wherein the determiner determines whether the luminances of the face region detected by the face detector satisfy the specific relations.

(Supplementary Note 7)

The detecting device according to Supplementary Note 6, wherein the face detector detects a characteristic region from the face region, and the determiner determines whether the luminances of the characteristic region in the images detected by the face detector satisfy specific relations.

(Supplementary Note 8)

The detecting device according to Supplementary Note 7, wherein the face detector detects at least one of a forehead region, right cheek region, and left cheek region as the characteristic region.

(Supplementary Note 9)
The detecting device according to any one of Supplementary Notes 1 to 8, wherein
the image acquirer acquires the images in multiple different wavelength ranges by splitting reflected light of the light emitted at the person.

(Supplementary Note 10)
The detecting device according to any one of Supplementary Notes 1 to 8, wherein
the image acquirer comprises:
multiple image capturers provided at different positions for each of the specific wavelength ranges and capturing images in corresponding wavelength ranges; and
an image corrector acquiring images in which the images captured by the multiple image capturers are corrected as if the person was photographed at one and the same point.

(Supplementary Note 11)
The detecting device according to any one of Supplementary Notes 1 to 10, wherein
the determiner further comprises a notifier giving notice of the specific relations being satisfied when determined so.

(Supplementary Note 12)
The detecting device according to any one of Supplementary Notes 1 to 11, wherein
the light emitted at the person is infrared light emitted from a halogen light source.

(Supplementary Note 13)
The detecting device according to Supplementary Note 2, wherein
the disguise is a disguise with a silicone disguising mask.

(Supplementary Note 14)
A detecting method, comprising:
an image acquisition step of acquiring images in multiple different wavelength ranges of reflected light of light emitted at a person; and
a determination step of determining whether luminances of a face region in the images acquired in the image acquisition step satisfy specific relations different from relations exhibited by skin.

(Supplementary Note 15)
A non-transitory recording medium saving a program that allows a computer to function as:
a determiner determining whether luminances of a face region in images of a person captured in multiple different wavelength ranges satisfy specific relations different from relations exhibited by skin.

INDUSTRIAL APPLICABILITY

The present disclosure is preferably used for determining whether a person entering a country is disguising in an immigration area.

REFERENCE SIGNS LIST 1, 2, 3, 1' Disguising mask detecting device
11 Light source
12, 18 ($18_A$ to $18_D$) Camera
121 Lens
122 Beam splitter
123 ($123_A$ to $123_D$) Filter
124 ($124_A$ to $124_D$) CMOS
13 Speaker
14 Liquid crystal monitor
15 Operator
16 External storage
17 Controller
171 Imaging controller
172 Face detector
173 Determiner
174 Notifier
175 Image corrector

The invention claimed is:
1. A detecting device comprising:
at least one memory configured to store instructions; and
at least one processor configured to execute the instructions to perform:
acquiring four images of a person, wherein three images are captured in at least three different infrared wavelength ranges and one image is captured in visible light and wherein the four images are taken simultaneously;
analyzing the visible light image captured by the image acquirer and to detect a face region of the person, wherein the face region includes three different face regions, the three different face regions being a forehead region, a right cheek region, and a left cheek region in the face region; and
determining whether the person is wearing a disguise by determining and judging whether luminance of pixels of the three different face regions satisfy specific relations between the three infrared images based on the three images, wherein the disguise is made of silicone, and
the at least one processor is configured to execute the instructions to perform:
acquiring the images in infrared wavelength ranges from 1161 to 1171 nm, from 1185 to 1195 nm, and from 1209 to 1219 nm separately, and
determining that the specific relations are satisfied when the luminance of the face region in the image in the infrared wavelength range from 1185 to 1195 nm is lower than the luminance of the face region in the images in the infrared wavelength ranges from 1161 to 1171 nm and from 1209 to 1219 nm, wherein the luminance of the face region is defined by the luminance of pixels in said region.

2. The detecting device according to claim 1, wherein
the at least one processor is configured to execute the instructions to perform:
determining that the specific relations are satisfied when the luminance within the face region in the image in the infrared wavelength range from 1209 to 1219 nm is higher than the luminance of the face region in the image in the infrared wavelength range from 1161 to 1171 nm.

3. A detecting method comprising:
acquiring four images of a person, wherein three images are captured in at least three different infrared wavelength ranges and one image is captured in visible light and wherein the four images are taken simultaneously;
analyzing the visible light image captured by the image acquirer and to detect a face region of the person, wherein the face region includes three different face regions, the three different face regions being a forehead region, a right cheek region, and a left cheek region in the face region; and
determining whether the person is wearing a disguise by determining and judging whether luminance of pixels of the three different face regions satisfy specific relations between the three infrared images based on the three images, wherein the disguise is made of silicone, and the at least one processor is configured to execute the instructions to perform:

acquiring the images in infrared wavelength ranges from 1161 to 1171 nm, from 1185 to 1195 nm, and from 1209 to 1219 nm separately, and determining that the specific relations are satisfied when the luminance of the face region in the image in the infrared wavelength range from 1185 to 1195 nm is lower than the luminance of the face region in the images in the infrared wavelength ranges from 1161 to 1171 nm and from 1209 to 1219 nm, wherein the luminance of the face region is defined by the luminance of pixels in said region.

4. The detecting method according to claim 3, wherein the detecting method comprises:

determining that the specific relations are satisfied when the luminance within the face region in the image in the infrared wavelength range from 1209 to 1219 nm is higher than the luminance of the face region in the image in the infrared wavelength range from 1161 to 1171 nm.

5. A non-transitory program recording medium that records a program causing a computer to execute processing of:

acquiring four images of a person, wherein three images are captured in at least three different infrared wavelength ranges and one image is captured in visible light and wherein the four images are taken simultaneously;

analyzing the visible light image captured by the image acquirer and to detect a face region of the person, wherein the face region includes three different face regions, the three different face regions being a forehead region, a right cheek region, and a left cheek region in the face region; and determining whether the person is wearing a disguise by determining and judging whether luminance of pixels of the three different face regions satisfy specific relations between the three infrared images based on the three images, wherein the disguise is made of silicone, and the at least one processor is configured to execute the instructions to perform:

acquiring the images in infrared wavelength ranges from 1161 to 1171 nm, from 1185 to 1195 nm, and from 1209 to 1219 nm separately, and determining that the specific relations are satisfied when the luminance of the face region in the image in the infrared wavelength range from 1185 to 1195 nm is lower than the luminance of the face region in the images in the infrared wavelength ranges from 1161 to 1171 nm and from 1209 to 1219 nm, wherein the luminance of the face region is defined by the luminance of pixels in said region.

6. The non-transitory program recording medium according to claim 5, wherein the program causes the computer to execute processing of:

determining that the specific relations are satisfied when the luminance within the face region in the image in the infrared wavelength range from 1209 to 1219 nm is higher than the luminance of the face region in the image in the infrared wavelength range from 1161 to 1171 nm.

* * * * *